US011679783B2

(12) United States Patent
Otliga (10) Patent No.: US 11,679,783 B2
(45) Date of Patent: Jun. 20, 2023

(54) METHOD OF AND SYSTEM FOR GENERATING TRAJECTORY FOR SELF-DRIVING CAR (SDC)

(71) Applicant: YANDEX SELF DRIVING GROUP LLC, Moscow (RU)

(72) Inventor: Victor Igorevich Otliga, Minsk (BY)

(73) Assignee: YANDEX SELF DRIVING GROUP LLC, Moscow (RU)

( * ) Notice: Subject to any disclaimer, the term of this patent is extended or adjusted under 35 U.S.C. 154(b) by 200 days.

(21) Appl. No.: 17/114,489

(22) Filed: Dec. 7, 2020

(65) Prior Publication Data

US 2021/0188327 A1 Jun. 24, 2021

(30) Foreign Application Priority Data

Dec. 24, 2019 (RU) .......................... RU2019143605

(51) Int. Cl.
*B60W 60/00* (2020.01)
*G05D 1/02* (2020.01)

(52) U.S. Cl.
CPC ...... *B60W 60/00274* (2020.02); *B60W 60/00276* (2020.02); *G05D 1/0212* (2013.01);
(Continued)

(58) Field of Classification Search
CPC ..... B60W 60/00274; B60W 60/00276; B60W 2554/4042; B60W 2554/4043; B60W 2554/4046; G05D 1/0212; G05D 1/0287
See application file for complete search history.

(56) References Cited

U.S. PATENT DOCUMENTS 10,235,882 B1 3/2019 Aoude et al.
10,275,797 B2 4/2019 Freytag et al.
(Continued)

FOREIGN PATENT DOCUMENTS

EP 3324332 A1 5/2018
RU 2631543 C1 9/2017
WO 2018115963 A2 6/2018

OTHER PUBLICATIONS

Russian Search Report dated Feb. 16, 2021 issued in respect of the counterpart Russian Patent Application No. RU 2019143605.
(Continued)

*Primary Examiner* — Peter D Nolan
*Assistant Examiner* — Mikko Okechukwu Obioha
(74) *Attorney, Agent, or Firm* — BCF LLP (57) ABSTRACT

A method and an electronic device for generating a trajectory of a Self-Driving Car (SDC) are provided. The method comprises: determining a presence of at least one third-party object around the SDC; generating a plurality of predicted trajectories for the third-party object, where at least one of the plurality of trajectories includes a maneuver executable, by the third-party object, at a future third-party object location; calculating, for the at least one of the plurality of trajectories including the a respective braking profile associated with the third-party object; in response to the respective braking profile being above a pre-determined threshold, eliminating an associated one of the at least one of the plurality of trajectories from future processing; determining an SDC trajectory based on remaining ones of the plurality of predicted trajectories for the third-party.

17 Claims, 5 Drawing Sheets

(52) U.S. Cl.
    CPC ... *G05D 1/0287* (2013.01); *B60W 2554/4042* (2020.02); *B60W 2554/4043* (2020.02); *B60W 2554/4046* (2020.02)

(56) References Cited

U.S. PATENT DOCUMENTS

| | | |
|---|---|---|
| 10,303,166 B2 | 5/2019 | Iagnemma |
| 10,325,491 B1 | 6/2019 | Fields et al. |
| 11,417,107 B2 * | 8/2022 | Kunze .................... G06V 20/54 |
| 2019/0034794 A1 | 1/2019 | Ogale et al. |
| 2019/0072965 A1 | 3/2019 | Zhang et al. |
| 2019/0072966 A1 | 3/2019 | Zhang et al. |
| 2019/0079516 A1 | 3/2019 | Censi et al. |
| 2019/0080266 A1 | 3/2019 | Zhu et al. |
| 2019/0094867 A1 | 3/2019 | Vernaza et al. |
| 2019/0295179 A1 | 9/2019 | Shalev-Shwartz et al. |
| 2021/0188327 A1 * | 6/2021 | Otliga .................... G08G 1/166 |
| 2021/0201504 A1 * | 7/2021 | Xu .......................... G06T 7/246 |
| 2022/0032923 A1 * | 2/2022 | Park ....................... B60K 28/06 |
| 2022/0081006 A1 * | 3/2022 | Kang ................ B60W 60/0027 |
| 2022/0144303 A1 * | 5/2022 | Agarwal ................ G06V 20/56 |

OTHER PUBLICATIONS

European Search Repod dated Mar. 22, 2021 issued in respect of the counterpad European Patent Application No. EP 20197964.8.

* cited by examiner

METHOD OF AND SYSTEM FOR GENERATING TRAJECTORY FOR SELF-DRIVING CAR (SDC)

CROSS-REFERENCE

The present application claims priority to Russian Patent Application No. 2019143605, entitled "Method of and System for Generating Trajectory for Self-Driving Car (SDC)", filed Dec. 24, 2019, the entirety of which is incorporated herein by reference.

FIELD OF TECHNOLOGY

The present technology relates to computer-implemented methods and systems for computer-assisted cars, and more specifically, to methods and systems for generating a trajectory for a self-driving car (SDC).

BACKGROUND

Fully or highly automated driving systems may be designed to operate a vehicle on the road without driver interaction (e.g., driverless mode) or other external control. For instance, self-driving vehicles and/or autonomous vehicles are designed to operate a vehicle in a computer-assisted manner.

An autonomous vehicle, or simply, a Self-Driving Car (SDC, for short), is configured to traverse a planned path between its current position and a target future position without (or with minimal) input from the driver. To that end, the SDC may have access to a plurality of sensors to "perceive" its surrounding area. For example, a given implementation of the SDC can include one or more cameras, one or more LIDARs, and one or more radars. The SDC may further have access to a 3D map to localize itself in the space.

One of the technical challenges associated with the SDC's is their ability to predict, or otherwise determine trajectories of other road users (other vehicles, for example) travelling in the surrounding area of the SDC, for example, in neighbouring lanes. When a given vehicle, travelling, for example, ahead of the SDC in a neighbouring lane, is about to perform a maneuver (such as turning left or right), its trajectory may overlap and/or intersect (at least partially) with the trajectory of the SDC, which may cause high risk of collision between the SDC and one of the other vehicles (including the given one) in the surrounding area. Consequently, this may require the SDC to take corrective measures, be it braking or otherwise active accelerating resulting in building the SDC trajectory ensuring minimal risk of an accident.

There are several trajectory-determination methods known in the art.

United States Patent Application Publication No.: 2019/0295179 A1 published on Sep. 26, 2019, assigned to Mobileye Vision Technologies Ltd, and entitled "Navigation with Liability Tracking" teaches an accident liability tracking system includes a processing device programmed to receive, from an image capture device, an image representative of an environment of the host vehicle, to analyze the image to identify a target vehicle in the environment of the host vehicle, and determine one or more characteristics of a navigational state of the target vehicle. The device is further programmed to compare the characteristics of the navigational state of the target vehicle to at least one accident liability rule, store one or more values indicative of potential accident liability on the part of the identified target vehicle based on the comparison of the characteristics of the navigational state of the identified target vehicle to the at least one accident liability rule, and output the one or more values, after an accident between the host vehicle and a target vehicle, for determining liability for the accident.

United States Patent Application Publication No.: 2019/0034794 A1 published on Jan. 31, 2019, assigned to Waymo LLC, and entitled "Neural Networks for Vehicle Trajectory Planning" teaches systems, methods, devices, and other techniques for training a trajectory planning neural network system to determine waypoints for trajectories of vehicles. A neural network training system can train the trajectory planning neural network system on the multiple training data sets. Each training data set can include: (i) a first training input that characterizes a set of waypoints that represent respective locations of a vehicle at each of a series of first time steps, (ii) a second training input that characterizes at least one of (a) environmental data that represents a current state of an environment of the vehicle or (b) navigation data that represents a planned navigation route for the vehicle, and (iii) a target output characterizing a waypoint that represents a target location of the vehicle at a second time step that follows the series of first time steps.

SUMMARY

It is an object of the present technology to ameliorate at least some of the inconveniences present in the prior art. Embodiments of the present technology may provide and/or broaden the scope of approaches to and/or methods of achieving the aims and objects of the present technology.

The developers of the present technology have realized that the trajectory-determination process for the vehicles in the surrounding area of the SDC is a resource and time consuming process. At the same time, it is desirable to determine third party trajectories as soon as possible to base the generation of the SDC's trajectory based on accurately predicted trajectories of third parties. Thus, developers of the present technology have appreciated that it may be desirable to reduce the number of third party trajectory candidates. Developers have also appreciated that some of such predicted trajectories may be associated with improbable maneuvers, i.e. those that cannot be physically performed by a given vehicle, in view of its instantaneous speed value or other current considerations.

Broadly speaking, the non-limiting embodiments of the present technology involve generating a trajectory for the given vehicle based on motion characteristics (for example, an instantaneous speed value), determined by sensors of the SDC, of the given vehicle, and based on this data, determining if the given vehicle would be able to perform an upcoming maneuver that is part of one or more predicted trajectories for the given vehicle. Based on this determination, the SDC may further either discount the upcoming maneuver for the given vehicle (and thus the associated predicted trajectory) maneuver. Finally, the SDC may proceed to generate the SDC trajectory in view of the remaining predicted trajectories determined for the given vehicle.

The acuteness of the technical problem od determining the trajectory of the given vehicle (that is not the SDC itself) can be illustrated by the following hypothetical scenario. Suppose the SDC, travelling along a given road section, has determined that one of vehicles, travelling, for example, in a neighbouring lane, has an instantaneous speed value substantially higher than the speed limit prescribed for the given section. The SDC can thus identify that vehicle as a road traffic offender (and it is known that road traffic offenders may be associated with erratic or generally unpredictable road behavior). At the same time, the SDC, may receive, from a 3D map, information indicative of an upcoming left turn, at a predetermined distance ahead of the SDC. As driving behaviours of road traffic offenders may be somewhat unpredictable, characterized by being a nuisance to or posing a danger to other road users, the SDC should be able to determine whether the road traffic offender is going to perform the upcoming left turn or not, and based on this, attempt to mitigate the risk of collision with any of the road users and overall use this information in generating the trajectory for the SDC itself.

In other words, the SDC may be able to determine, based on the instantaneous speed value of the given vehicle, what distance the given vehicle would require in order to slow down to a speed value allowing it to execute the maneuver. Continuing the above example where the maneuver is a left turn, the SDC may determine that, given the instantaneous speed value of the given vehicle, it would not be possible for it to perform the left turn as a distance for slowing down to the speed value, at which that left turn is physically possible for the given vehicle, is too long as it would be past the entrance to the left turn itself. Thus, the SDC may qualify that left turn, for the given vehicle, to be an improbable maneuver, thereby discounting the left turn from a plurality of possible trajectories for the given vehicle.

Alternatively, if the SDC has determined that the left turn would still be possible for the given vehicle to perform, for example, due to its instantaneous speed value not being too high as allowing it to decelerate to the maximum speed value associated with safely entering the left turn, the SDC may still consider the left turn among the plurality of possible trajectories for the given vehicle.

Finally, based on the determination of the improbable maneuver for the given vehicle, the SDC may proceed to generate the SDC trajectory based on the plurality of possible trajectories for the given vehicle.

In accordance with a first broad aspect of the present technology, there is provided a method for generating a trajectory for a self-driving car (SDC) The SDC is associated with an electronic device. The method is executable by the electronic device. The method comprises: determining, by the electronic device, a presence of at least one third-party object around the SDC; determining, by the electronic device, a current third-party object location; generating, by the electronic device, a plurality of predicted trajectories for the third-party object based on the current third-party object location, at least one of the plurality of trajectories including a maneuver executable, by the third-party object, at a future third-party object location as part of executing the at least one of the plurality of trajectories; calculating, for the at least one of the plurality of trajectories including the maneuver executable at the future third-party object location, a respective braking profile associated with the third-party object, the braking profile being indicative of a speed adjustment maneuver of the third-party object to enable the third-party object to execute the maneuver at the future third-party object location; in response to the respective braking profile being above a pre-determined threshold, eliminating an associated one of the at least one of the plurality of trajectories from future processing; determining, by the electronic device, an SDC trajectory based on remaining ones of the plurality of predicted trajectories for the third-party object.

In some implementations of the method, the third-party object is one of a plurality of third-party objects located in around the SDC.

In some implementations of the method, the method is executed for each of the plurality of third-party objects.

In some implementations of the method, the method is executed for each of the plurality of third-party objects.

In some implementations of the method, the method further comprises selecting the third-party object from the plurality of third-party objects and executing the method only for the third-party object.

In some implementations of the method, the selecting the third-party object from the plurality of third-party objects comprises applying a selection rule.

In some implementations of the method, the selection rule is indicative of a driver associated with the third-party object being likely to be a traffic rules offender.

In some implementations of the method, the pre-determined threshold is indicative of the maneuver executable at the future third-party object location being improbable.

In some implementations of the method, the maneuver executable at the future third-party object location being improbable is indicative of the maneuver being physically impossible given the braking profile.

In some implementations of the method, the pre-determined threshold is determined using a kinematic model.

In some implementations of the method, the kinematic model is based on a most abrupt braking profile.

In some implementations of the method, the kinematic model is based on at least one of: a minimum braking profile, an average braking profile, and a most abrupt braking profile.

In some implementations of the method, the pre-determined threshold is further based on a jerk model.

In some implementations of the method, the pre-determined threshold is +/−3 m/sec2.

In some implementations of the method, the third-party object is a dynamic third-party object.

In some implementations of the method, the plurality of predicted trajectories for the third-party object based on the current third-party object location is a plurality of maneuvers, by the third-party object, wherein a given one of the plurality of maneuvers is executable at a respective one of future third-party object locations, and wherein the method is executable for each of the future third-party object locations.

In accordance with a second broad aspect of the present technology, there is provided an electronic device. The electronic device comprises: a processor; a communication interface for communicating with a sensor mounted on a Self-Driving Car (SDC). The processor is configured to: determine, by the electronic device, a presence of at least one third-party object around the SDC; determine a current third-party object location; generate a plurality of predicted trajectories for the third-party object based on the current third-party object location, at least one of the plurality of trajectories including a maneuver executable, by the third-party object, at a future third-party object location as part of executing the at least one of the plurality of trajectories; calculate, for the at least one of the plurality of trajectories including the maneuver executable at the future third-party object location, a respective braking profile associated with the third-party object, the braking profile being indicative of a speed adjustment maneuver of the third-party object to enable the third-party object to execute the maneuver at the future third-party object location; in response to the respective braking profile being above a pre-determined threshold, eliminate an associated one of the at least one of the plurality of trajectories from future processing; determine an SDC trajectory based on remaining ones of the plurality of predicted trajectories for the third-party object.

In some implementations of the electronic device, the processor is further configured to select the third-party object from a plurality of third-party objects based on a selection rule.

In some implementations of the electronic device, the processor, to determine the pre-determined threshold, is further configured to have access to a kinematic model.

In the context of the present specification, a "server" is a computer program that is running on appropriate hardware and is capable of receiving requests (e.g. from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Figure 1:
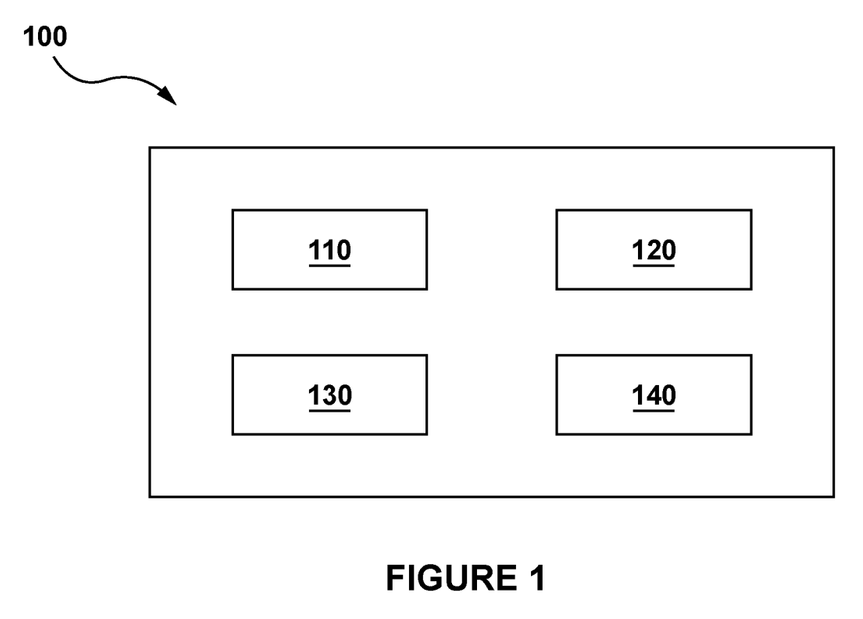
FIG. 1 depicts a schematic diagram of an example computer system for implementing certain embodiments of systems and/or methods of the present technology.

Referring initially to FIG. 1, there is shown a computer system 100 suitable for use with some implementations of the present technology, the computer system 100 comprising various hardware components including one or more single or multi-core processors collectively represented by a processor 110, a solid-state drive 120, a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for a variety of processing tasked. For example, the program instructions may be part of a vehicle control application executable by the processor 110. It is noted that the computer system 100 may have additional and/or optional components (not depicted), such as network communication modules, localization modules, and the like.

It is noted that the computer system 100 may have additional and/or optional components, such as a network communication module 140 for communication, via a communication network (for example, a communication network 245 depicted in FIG. 2) with other electronic devices and/or servers, localization modules (not depicted), and the like.

Networked Computer Environment

Figure 2:
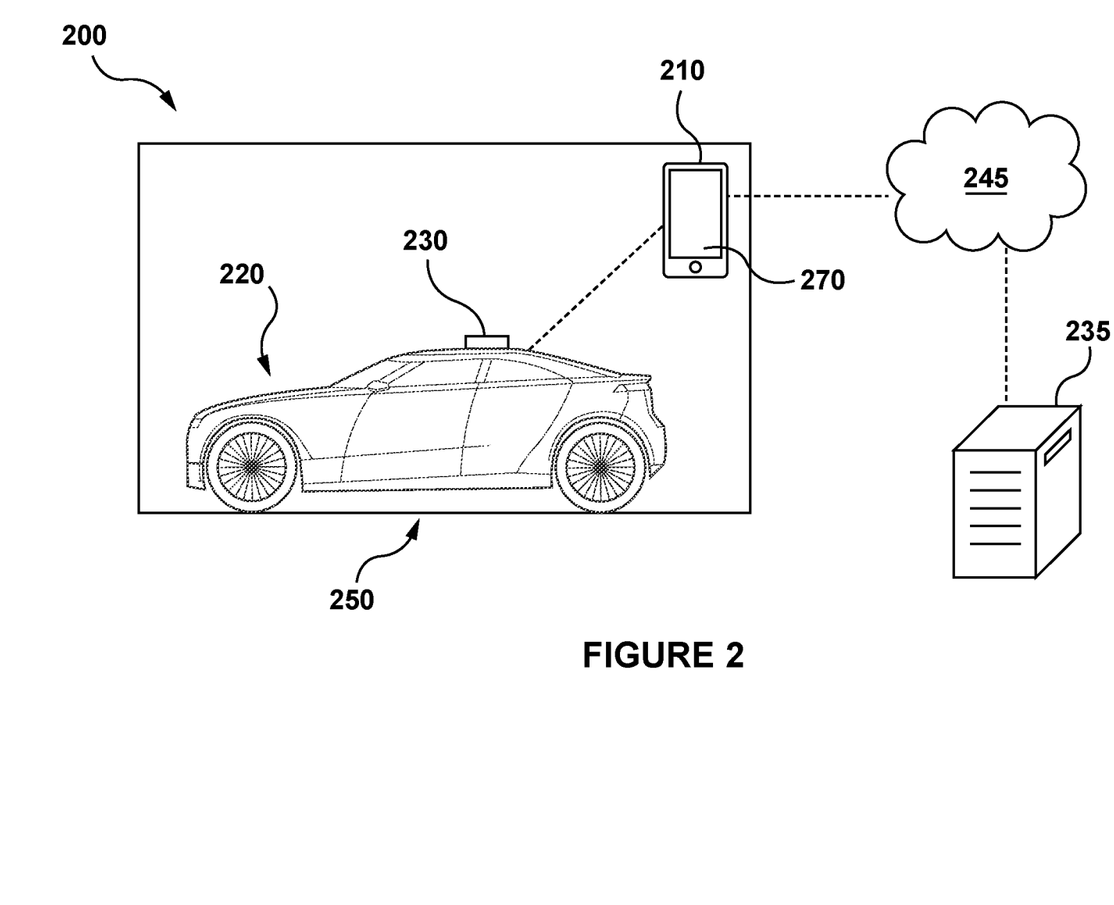
FIG. 2 depicts a networked computing environment being suitable for use with some implementations of the present technology.

FIG. 2 illustrates a networked computer environment 200 suitable for use with some embodiments of the systems and/or methods of the present technology. The networked computer environment 200 comprises an electronic device 210 associated with a vehicle 220, and/or associated with a user (not depicted) who can operate the vehicle 220, a server 235 in communication with the electronic device 210 via a communication network 245 (e.g. the Internet or the like, as will be described in greater detail herein below).

Optionally, the networked computer environment 200 can also include one or more satellites (not depicted) transmitting and/or receiving a GPS signal to/from the electronic device 210. It will be understood that the present technology is not limited to GPS and may employ a positioning technology other than GPS. It should be noted that the one or more satellites may be omitted in at least some embodiments of the present technology.

The vehicle 220, with which the electronic device 210 is associated, may comprise any transportation vehicle such as a private or commercial car, truck, motorbike or the like. Although the vehicle 220 is depicted as being a land vehicle, this may not be the case in each embodiment of the present technology. For example, the vehicle 220 may be a watercraft, such as a boat, or an aircraft, such as a flying drone.

The vehicle 220 may be user operated, a driver-less vehicle, or any other vehicle configured to be operated in a computer-assisted manner. It should be noted that specific parameters of the vehicle 220 are not limiting, these specific parameters including: vehicle manufacturer, vehicle model, vehicle year of manufacture, vehicle weight, vehicle dimensions, vehicle weight distribution, vehicle surface area, vehicle height, drive train type (e.g. 2x or 4x), tire type, brake system, fuel system, mileage, vehicle identification number, and engine size.

The implementation of the electronic device 210 is not particularly limited, but as an example, the electronic device 210 may be implemented as a vehicle engine control unit, a vehicle CPU, a vehicle navigation device (e.g. TomTom™, Garmin™), a tablet, a personal computer built into the vehicle 220 and the like. Thus, it should be noted that the electronic device 210 may or may not be permanently associated with the vehicle 220. Additionally or alternatively, the electronic device 210 can be implemented in a wireless communication device such as a mobile telephone (e.g. a smart-phone or a radio-phone). In certain embodiments, the electronic device 210 has a display 270.

The electronic device 210 may comprise some or all of the components of the computer system 100 depicted in FIG. 1. In certain embodiments, the electronic device 210 is on-board computer device and comprises the processor 110, the solid-state drive 120 and the memory 130. In other words, the electronic device 210 comprises hardware and/or software and/or firmware, or a combination thereof, for processing data as will be described in greater detail below.

Communication Network

In some non-limiting embodiments of the present technology, the communication network 245 is the Internet. In alternative non-limiting embodiments, the communication network can be implemented as any suitable local area network (LAN), wide area network (WAN), a private communication network or the like. It should be expressly understood that implementations for the communication network are for illustration purposes only. A communication link (not separately numbered) between the electronic device 210 and the communication network 245 is implemented will depend inter alia on how the electronic device 210 is implemented. Merely as an example and not as a limitation, in those embodiments of the present technology where the electronic device 210 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 245 may also use a wireless connection with the server 235.

Server

In some non-limiting embodiments of the present technology, the server 235 is implemented as a conventional computer server and may comprise some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server is a single server. In alternative non-limiting embodiments of the present technology (not shown), the functionality of the server 235 may be distributed and may be implemented via multiple servers.

In some non-limiting embodiments of the present technology, the processor 110 of the electronic device 210 can be in communication with the server 235 to receive one or more updates. The updates can be, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all data transmitted between the vehicle 220 and the server 235 may be encrypted and/or anonymized.

In some non-limiting embodiments of the present technology, the server 235 may have access (locally and/or remotely) to information indicative of a road map. Broadly speaking, the road map is a map of roads that are located in a city, a state, and/or other areas. For example, a section of the road map may include information such as, but not limited to: presence of roads in that section, number of lanes on these roads, presence of intersections, and the like.

In other non-limiting embodiments of the present technology, the server 235 may have access (locally and/or remotely) to information indicative of road rules associated with the road map. Broadly speaking, road rules represent traffic laws that are determined by a body having jurisdiction and that are applicable on at least some portions of the road map. For example, road rules associated with a given section of the road map are representative of traffic laws that are applicable for that given section of the road map such as, but not limited to: pre-determined direction of traffic flow of each lane in the section of the road map, presence of particular road signs governing traffic on that section of the road map including stop signs, yield signs, road lane signage, speed limits, indications of other types of traffic laws or rules, and the like.

It is contemplated that the server 235 may be configured to provide the processor 110 (e.g., the processor 110 of the electronic device 210) with access to the information indicative of (i) a section of the road map corresponding to surroundings of the vehicle 220 and (ii) the road rules associated with that section of the road map.

To that end, in some embodiments, the server 235 may receive a request submitted by the electronic device 210 for provision of access to the information indicative of the section of the road map (corresponding to the surroundings of the vehicle 220) and of the respectively associated road rules. For example, the request submitted by the electronic device 210 may include information indicative of vehicle position (possibly in global coordinates) of the vehicle 220. As a result, the server 235 may provide the electronic device 210 with access to the information (or provide the information itself) indicative of the section of the road map that includes the vehicle position of the vehicle 220 and of the respectively associated road rules.

For what purpose the server 235 may be configured to provide the electronic device 210 with access to the information indicative of the section of the road map corresponding to the surroundings of the vehicle 220 and the road rules associated with that section of the road map will be described in greater details herein further below.

However, the electronic device 210 may be configured to acquire access to the information (or acquire the information itself) indicative of the section of the road map corresponding to the surroundings of the vehicle 220 and of the respectively associated road rules in a different manner than via the server 235. For instance, the information indicative of the road map and the road rules may be pre-downloaded and pre-stored by the electronic device 210, without departing from the scope of the present technology.

Sensor System

In accordance with at least some embodiments of the present technology, the electronic device 210 is communicatively coupled to a sensor system 230. Broadly speaking, the sensor system 230 is configured to capture data/signals about the surroundings of the vehicle 220. The sensor system 230 is communicatively coupled to the electronic device 210 for, inter alia, processing the so-captured information (data/signals) by the electronic device 210. As it will be described in greater detail herein below, the processor 110 may be configured to process the so-captured information about the surroundings of the vehicle 220 for decision making and/or operation of the vehicle 220.

The location of the sensor system 230 relative to the vehicle 220 is not particularly limiting. For example, the sensor system 230 may be mounted on an interior, upper portion of a windshield of the vehicle 220, but other locations are within the scope of the present disclosure, including a back window, side windows, front hood, rooftop, front grill, or front bumper of the vehicle 220. Optionally, the sensor system 230 may be mounted in a dedicated enclosure (not depicted) mounted on the top of the vehicle 220. However, it is also contemplated that various components and/or sub-systems of the sensor system 230 may be mounted at different locations on the vehicle 220, without departing from the scope of the present technology.

In some non-limiting embodiments of the present technology, the sensor system 230 may be calibrated. This calibration can be executed during the manufacturing and/or set up of the vehicle 220. Or at any suitable time thereafter or, in other words, the calibration can be executed during retrofitting the vehicle 220 with the sensor system 230. Alternatively, the calibration can be executed during equipping the vehicle 220 with the sensor system 230.

In other non-limiting embodiments of the present technology, the calibration of certain components of the sensor system 230 may be implemented during the operation of the vehicle 220 as described in a co-owned patent application entitled METHODS AND SYSTEMS FOR CALIBRATING MULTIPLE LIDAR SENSORS (an application number being not yet available); the content of which is hereby incorporated by reference in its entirety.

Returning to the description of the configuration of the sensor system 230, in some non-limiting embodiments, the sensor system 230 may be configured to gather a large variety of information (data/signals) about the surroundings of the vehicle 220 and, to that end, may comprise a verity of components and/or a variety of sub-systems configured to capture this large variety of information.

In some embodiments, the sensor system 230 may comprise a camera. How the camera is implemented is not particularly limiting. For example, in one embodiments of the present technology, the camera can be implemented as a mono camera with resolution sufficient to detect objects (such as neighboring vehicles and/or road signs, for example) at a pre-determined distance of up to about 50 m (although cameras with other resolutions and ranges are within the scope of the present disclosure). It is also contemplated that the sensor system 230 may comprise a plurality of cameras. For example, the plurality of cameras may have a sufficient number of cameras to capture a surrounding/panoramic digital image of the surroundings of the vehicle 220.

In some non-limiting embodiments of the present technology, the camera (or one or more cameras of the sensor system 230) may be configured to capture a pre-determined portion of the surroundings of the vehicle 220. For example, the one or more cameras may be configured to capture a digital image (or a series of digital images) that represent approximately 90 degrees of the surroundings of the vehicle 220 that are along a movement path of the vehicle 220. In another example, however, the one or more cameras may be configured to capture digital image(s) that represent approximately 360 degrees of the surroundings of the vehicle 220 that are along the movement path of the vehicle 220, without departing from the scope of the present technology. In a specific non-limiting example, the one or more cameras of the sensor system 230 may be of the type available from FLIR Integrated Imaging Solutions Inc., 12051 Riverside Way, Richmond, BC, V6 W 1K7, Canada. It should be expressly understood that the sensor system 230 can be implemented in any other suitable equipment.

In other embodiments, the sensor system 230 may comprises other components and/or other sub-systems that are communicatively coupled to the electronic device 210. For instance, the sensor system 230 may comprise: an Inertial Measurement Unit (IMU), a LIght Detection And Ranging (LIDAR) system, a radar system, a sonar system, other image-based sensory sub-systems, and other types of sub-systems that are configured to capture information (data/signals) about the surroundings of the vehicle 220.

As mentioned above, the sensor system 230 may be configured to capture a variety of information about the surroundings of the vehicle 220. For example, at least some information captured by the sensor system 230 about the surroundings of the vehicle 220 may comprise object-related information, such as information regarding neighboring vehicles and/or road signs in proximity to the vehicle 220. Additionally, the information about the surroundings of the vehicle 220 may include other types of position data that can be (i) captured by the sensor system 230 and (ii) transmitted to the processor 110.

For example, the sensor system 230 may be configured to capture data that, once processed, allow the electronic device 210 to detect the presence of, position of, and/or orientation of objects such as the vehicle 220, the neighboring vehicles, and/or road signs. In another example, the sensor system 230 may be configured to capture data that, once processed, allow the electronic device 210 to determine kinematic data associated with various objects that are located in the surroundings of the vehicle 220 such as, but not limited to: positions of objects, speed and/or velocity of objects, acceleration of objects, and the like.

It is also contemplated that the sensor system 230 may be configured to capture data that, once processed, allow the electronic device 210 to determine inter alia: (i) vehicle position of the vehicle 220 (potentially in global coordinates) based on signals (e.g., GPS signals) from a plurality of satellites, (ii) distances of the vehicle 220 to objects within the surroundings of the vehicle 220 for determining position and orientation of the vehicle 220 and of the objects within the surroundings of the vehicle 220, and (iii) any other data that may be used to determine a current state of the vehicle 220 and/or a current state of the surroundings of the vehicle 220 including the presence of, position of, and orientation of neighboring vehicles in reference to the vehicle 220 and/or to another reference in the surroundings of the vehicle 220 (such as an intersection, for example).

The sensor system 230 and/or the processor 110 may also be communicatively coupled to one or more vehicle systems of the vehicle 220. For example, the sensor system 230 may be communicatively coupled to a vehicle braking system, a vehicle propulsion system, a vehicle steering system, and the like. In some non-limiting embodiments of the present technology, the sensor system 230 and/or the processor 110 may acquire information indicative of performance of the one or more vehicle systems of the vehicle 220.

Processor

As previously alluded to, the processor 110 (such as the processor 110 of the electronic device 210, for example) is configured to, inter alia, process (i) information that is provided thereto by the sensor system 230, (ii) information that is indicative of the section of the road map corresponding to the surroundings of the vehicle 220, and (iii) information that is indicative of the road rules associated with that section of the road map, for the purpose of decision making and/or operation of the vehicle 220 (such as generating manoeuvres and other trajectories for the vehicle 220).

In accordance with the non-limiting embodiments of the present technology, based at least on the data above, the processor 110 may be configured to determine a trajectory for the vehicle 220 with respect to at least one third-party object moving in a given road map section.

In this regard, the processor 110 may be configured to (1) generate a plurality of predicted trajectories for the at least one third-party object based, for example, on its current motion parameters and location; (2) determine, within the plurality of predicted trajectories associated with the at least one third-party object, one or more improbable trajectories; and (3) eliminate the one or more improbable trajectories from the plurality of predicted trajectories for further processing by the processor 110. At least some non-limiting embodiments of the present technology may lead to faster processing and/or reduced computer resources requirement In the non-limiting embodiments of the present technology, an "improbable trajectory" should be understood to mean any trajectory that cannot physically be executed by the at least one third-party object (also referred to herein a "physically impossible" trajectory), i.e. a trajectory, along which the at least one third-party object, given its current motion parameters (for example, an instantaneous velocity value) or any other consideration, physically cannot move, or otherwise moving along such the trajectory is very likely to be associated with higher risk of accident among other third-party objects and the vehicle 220.

As such, in the non-limiting embodiments of the present technology, the improbable trajectories include those that include maneuvers, such as turns, U-turns, a lane change, and the like.

To put it another way, the non-limiting embodiments of the present technology are directed to a method for filtering out, by the processor 110, improbable trajectories from the plurality of predicted trajectories associated with the at least one third-party object, and using the "refined" plurality of predicted trajectories for further processing.

In the non-limiting embodiments of the present technology, the further processing of the so-generated plurality of predicted trajectories may include generating the trajectory for the vehicle 220. Specifically, the processor 110 may cause, based on the so-generated trajectory for the vehicle 220, at some moment in time, the vehicle 220 to decelerate, or otherwise actively accelerate, perform a maneuver (a lane change, for example), and the like, in order to avoid, or mitigate the risk of, a collision with any third-party objects in a given road map section.

In the non-limiting embodiments of the present technology, the at least one third-party object may comprise a dynamic third-party object including another vehicle (such as a car, a truck, and the like), a cyclist, an astray animal, etc.

How the processor 110 is configured to determine improbable trajectories in the plurality of predicted trajectories associated with the at least one third-party object will be now described with reference to FIGS. 3 and 4.

Figure 3:
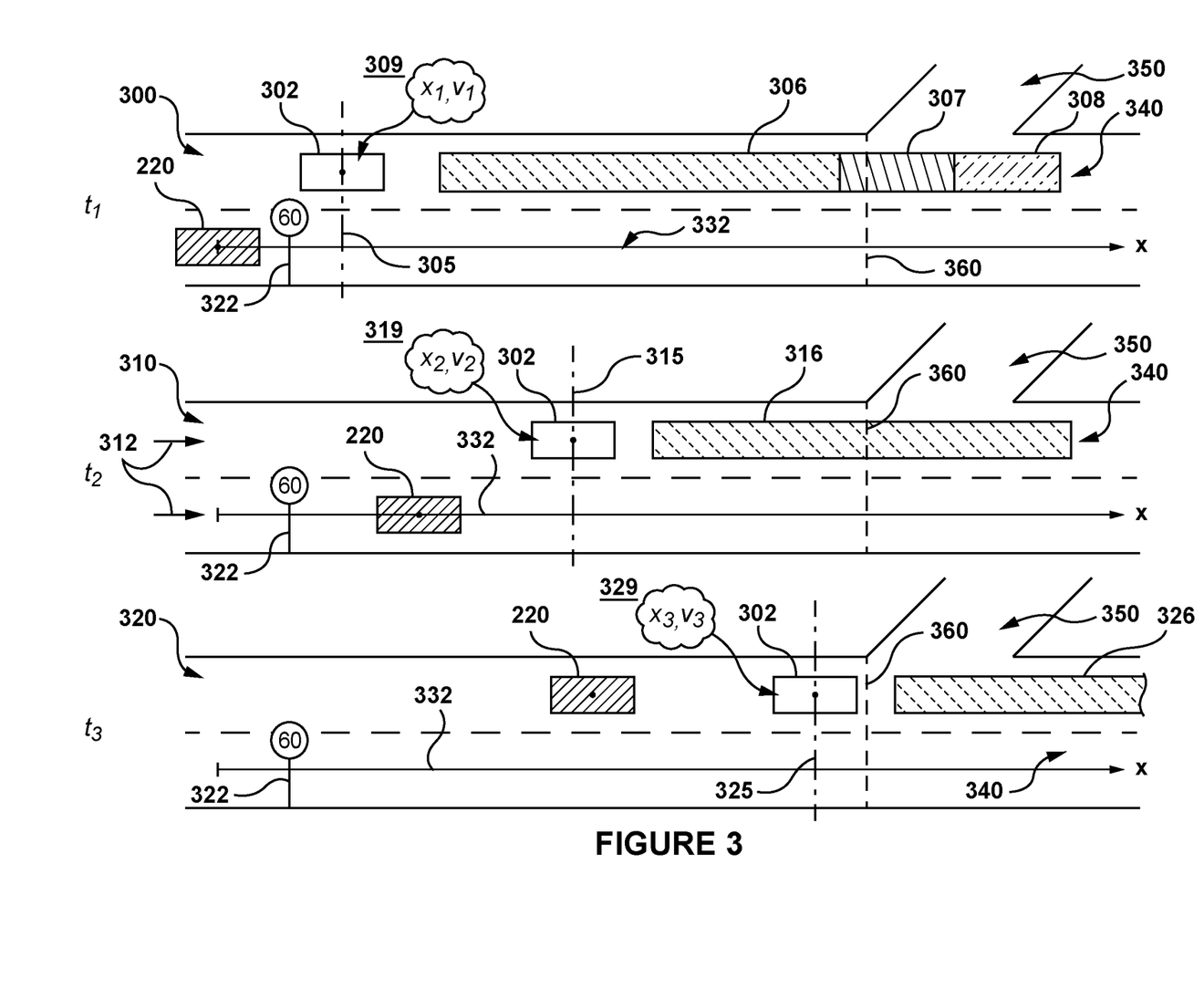
FIG. 3 depicts an example of a scenario for determining, by a processor of an electronic device of the networked computing environment of FIG. 2, a trajectory for a vehicle present in the networked computing environment of FIG. 2, in accordance with the non-limiting embodiments of the present technology.

With reference to FIG. 3, there is depicted an example of a road scenario for determining the trajectory for the vehicle 220, in accordance with the non-limiting embodiments of the present technology.

In the embodiments of FIG. 3, the vehicle 220 is travelling along a lane. The surroundings of the vehicle 220 are depicted by a road map section 340. Further, in the road map section 340, there is depicted a third-party object 302 driving in a neighbouring lane relative to the lane the vehicle 220 is travelling in. The presence of the third-party object 302 has been determined by the processor 110 based on data captured by the sensor system 230.

As can be appreciated from FIG. 3, the road map section 340 is depicted by three visual representations thereof: a first visual representation 300, a second visual representation 310, and a third visual representation 320, each respectively corresponding to different moments in time.

More specifically, each of the visual representations 300, 310, and 320 generally illustrates the road map section 340 having (1) two lanes (extending from left to right in the orientation of FIG. 3), and (2) the third-party object 302. For illustration purposes only, it should be assumed that both the vehicle 220 and the third-party object 302 are travelling in the direction of the traffic indicated by arrows 312. Further, the vehicle 220 and the third-party object 302 are travelling in respective ones of the neighbouring lanes. It should further be noted that the visual representations 300, 310, and 320 are depicted solely for purposes of illustration of the scenario and, thus, the processor 110 does not actually display the visual representations 300, 310, and 320.

As can be further appreciated from FIG. 3, the visual representations 300, 310, and 320 also include representations of at least some traffic rules associated with the road map section 340. For example, the at least some road rules may prescribe traffic directions which travelling vehicles must abide by, and which is depicted by arrows 312. In another example, the at least some traffic rules may further prescribe a maximum allowed speed limit depicted by a representation of a road sign 322. It should be noted however, that the visual representations of the at least some traffic rules 312 and 322 are depicted solely for purposes of illustration of the example scenario and, thus, the processor 110 does not have to actually display the visual representations of the at least some traffic rules 312 and 322.

Finally, each of the visual representations 300, 310, and 320 also depicts a coordinate axis 332 extending from left to right (in the orientation of FIG. 3) and coinciding with the direction of the traffic in the road map section 340. The coordinate axis 332 serves solely as an aid in understanding the non-limiting embodiments of the present technology, and thus does not have to be displayed by the processor 110.

In some non-limiting embodiments of the present technology, the third-party object 302 may be one of a plurality of third-party objects (not depicted) present in the road map section 340.

Thus, in some non-limiting embodiments of the present technology, the processor 110 may be configured to generate the trajectory for the vehicle 220 based on respective pluralities of predicted trajectories of the plurality of third-party objects (not depicted). Therefore, although the description below has been provided with respect to the third-party object 302, it should be expressly understood that this description may apply, mutatis mutandis, to each of the plurality of third-party objects (not depicted), such as tens or hundreds third-party objects, without departing from the scope of the present technology.

In other non-limiting embodiments of the present technology, for generating the trajectory for the vehicle 220, after determining presence of each of the plurality of third-party objects (not depicted), the processor 110 may be configured to select, based on a selection rule, only the third-party object 302 (or a subset of third party objects including the third-party object 302) from the plurality of third-party objects (not depicted).

In the non-limiting embodiments of the present technology, the selection rule may be based on kinematic data determined by the processor 110 using the sensor system 230, for each of the plurality of third-party objects (not depicted), at a moment of determining presence thereof.

In the non-limiting embodiments of the present technology, the third party kinematic data comprises at least (1) a coordinate value along the coordinate axis 332, x; (2) an instantaneous velocity value, v; and (3) an instantaneous acceleration/deceleration value, a.

Thus, for example, the processor 110 may have determined that an instantaneous velocity value v of the third-party object 302, at the moment of determining the presence thereof, is a predetermined velocity threshold value (for example, 20 km/h) higher than a speed limit prescribed for the road map section 340. Accordingly, the processor 110 may be configured to select the third-party object 302 from the plurality of third-party objects (not depicted), based on its instantaneous velocity value, for generating the trajectory for the vehicle 220.

In another example, let it be assumed that the third-party object 302 is moving before the vehicle 220 in the same lane; and the processor 110 may determine, at the moment of determining the presence of the third-party object 302, based on its coordinate value x, that a longitudinal distance between the third-party object 302 and the vehicle 220 is shorter than a predetermined distance threshold value (for example, 3 metres). Accordingly, the processor 110 may is configured to select the third-party object 302 from the plurality of third-party objects (not depicted), based on the longitudinal distance to the vehicle 220, for generating the trajectory for the vehicle 220.

In other words, the processor 110 may be configured to select the third-party object 302 from the plurality of third-party objects (not depicted) if a driver associated with the third-party object 302 may be qualified as a road traffic offender based on the kinematic data associated with the third-party object 302.

In the context of the present disclosure the term "road traffic offender" refers to a driver, whose driving behaviour may be qualified as erratic as putting the vehicle 220 and other third party objects of the plurality of third-party objects (not depicted), in the road map section 340, at risk of collision thereamong. It should be noted that other selection rules can be applied as well. It should also be noted that the selection step may be omitted altogether, and the processor 110 may process all of the plurality of third-party objects (not depicted).

Continuing with the present example, having selected the third-party object 302 for generating the trajectory for the vehicle 220, the processor 110 is configured to generate a plurality of predicted trajectories for the third-party object 302, based on a current kinematic data associated therewith (such as a first third-party kinematic data 309 depicted at the first visual representation 300) and road map information. To that end, based on the road map section 340, the processor 110 may generate the plurality of predicted trajectories, for the third-party object 302, comprising a first trajectory including taking a left turn 350 at a predetermined future location of the third-party object 302 (such as an entrance 360 to the left turn 350) and a second trajectory including continuing to move forward, without taking the left turn 350.

Further, in accordance with the non-limiting embodiments of the present technology, the processor 110 is configured to determine, in the plurality of predicted trajectories associated with the third-party object 302, improbable trajectories such as those that the third-party object 302 would not be physically able to execute.

In this regard, in the non-limiting embodiments of the present technology, to determine the improbable trajectories in the plurality of predicted trajectories, the processor 110 is configured to calculate braking profiles for the third-party object 302 at its predetermined coordinate values x, so-called anchor points, corresponding to different moments in time as the third-party object 302 is moving within the road map section 340. In some non-limiting embodiments, the processor 110 is configured to calculate the braking profile for the third-party object 302 only at a current anchor point.

In the non-limiting embodiments of the present technology, the processor 110 may be configured to generate a plurality of anchor points in such a way that each anchor point would be separated from another one by a predetermined distance (for example, 10 or 20 meters). It should be expressly understood that other fashions of generating the plurality of anchor points are not beyond the scope of the present technology.

Thus, for example, at a first moment in time $t_1$ corresponding to the moment of determining the presence of the third-party object 302 in the road map section 340, the processor 110 may be configured to generate a first anchor point 305. Further, based on the predetermined distance between two consecutive anchor points, the processor 110 may be configured to generate the plurality of anchor points comprising, aside from the first anchor point 305, a second anchor point 315, and a third anchor point 325, each being respectively associated with the visual representations 300, 310, and 320 of the road map section 340.

Broadly speaking, a given braking profile, at a given one of the plurality of anchor points, is indicative of a distance needed for the third-party object 302, in view of its kinematic data, to decelerate to a maximum acceptable velocity value v allowing the third-party object 302 to physically take a respective one of the plurality of predicted trajectories.

Therefore, in the non-limiting embodiments of the present technology, the processor 110 is configured to determine, by the sensor system 230, at each of the plurality of anchor points (or on some alternative embodiments, for the given current anchor point), as the third-party object 302 moves within the road map section 340, a third-party object kinematic data associated therewith.

Accordingly, the first visual representation 300 depicts a first state of the road map section 340, at the first moment in time $t_1$ when the processor 110 starts tracking the motion of the third-party object 302. To that end, the first state of the road map section 340 includes a first state of the third-party object 302 characterized by a first third-party kinematic data 309, $\{x_1, v_1\}$, where $x_1$ is a coordinate value of the third-party object 302 corresponding to the first anchor point 305;

$v_1$ is an instantaneous velocity value of the third-party object 302 at the first anchor point 305.

The second visual representation 310 depicts a second state of the road map section 340 at a second moment in time $t_2$ when the third-party object is passing the second anchor point 315. To that end, the second state of the road map section 340 includes a second state of the third-party object 302 characterized by a second third-party kinematic data 319, $\{x_2, v_2\}$, where $x_2$ is a coordinate value of the third-party object 302 corresponding to the second anchor point 315;

$v_2$ is an instantaneous velocity value of the third-party object 302 at the second anchor point 315.

Finally, the third visual representation 320 depicts a third state of the road map section 340 at a third moment in time $t_3$ when the third-party object is passing the third anchor point 325. The third state of the road map section 340 includes a third state of the third-party object 302 characterized by a third third-party kinematic data 329, $\{x_3, v_3\}$, where $x_3$ is a coordinate value of the third-party object 302 corresponding to the third anchor point 325;

$v_3$ is an instantaneous velocity value of the third-party object 302 at the third anchor point 325.

Thus, for example, the processor 110 is configured to calculate, at the first anchor point 305, a first braking profile 306. Further, based on the indication of the entrance 360 to the left turn 350, the processor 110 is configured to determine that it would be possible for the third-party object 302 to assume the first trajectory of the plurality of predicted trajectories as it would be possible for the third-party object 302, given the first third-party kinematic data 309, to decelerate to an acceptable velocity value v for performing the left turn 350 before the entrance 360 thereto (making it physically possible). Accordingly, at the first moment in time $t_1$, the processor 110 does not filter out the first trajectory as improbable and keeps it, in the plurality of predicted trajectories associated with the third-party object 302, for further generating the trajectory for the vehicle 220.

By doing so, in a sense, the processor 110 "examines" each of the plurality of predicted trajectories associated with the third-party object 302 for feasibility of their execution by the third-party object 302, given its kinematic data, at a respective anchor point. More specifically, the processor 110 determines the feasibility of the first trajectory including the left turn 350 as the second trajectory (moving forward) may be considered feasible (and thus probable), in the described embodiments, given any third-party object kinematic data.

Accordingly, the processor 110 is configured to generate, successively, at the second anchor point 315 and the third anchor point 325, a second braking profile 316 and a third braking profile 326, respectively. Further, at each of the associated moments in time $t_2$ and $t_3$, the processor 110 is configured either to determine if the first trajectory from the plurality of the predicted trajectories associated with the third-party object 302 should be eliminated from further generating the trajectory for the vehicle 220 or not. How the processor 110 calculates a given braking profile will now be described with reference to FIG. 4.

Figure 4:
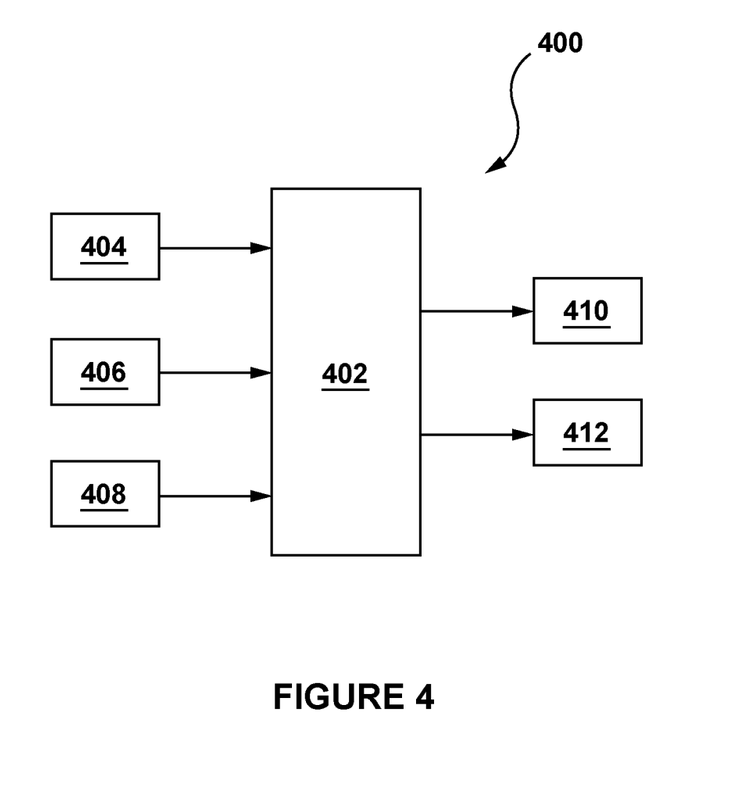
FIG. 4 schematically depicts a process for calculating a given braking profile for a third-party object located in a surrounding area of the vehicle present in the networked computing environment of FIG. 2, in accordance with the non-limiting embodiments of the present technology.

With reference to FIG. 4, there is schematically depicted a process 400 for calculating, by the processor 110, a braking profile for the third-party object 302, in accordance with the non-limiting embodiments of the present technology.

In the process 400, the processor 110 is configured to access a kinematic model 402. Broadly speaking, the kinematic model 402 represents a combination of mathematical models configured to calculate a given braking profile 410 for the third-party object 302 approaching a given one of the plurality of predicted trajectories including a maneuver. To that end, in the non-limiting embodiments of the present technology, the kinematic model 402 may have access to the following data: (i) a given third-party kinematic data 404, the given third-party kinematic data 404 having been determined by the processor 110 at a given anchor point; (ii) a maximum acceptable velocity 406 at a predetermined future location before the maneuver; and (iii) a maximum possible velocity 408 of the third-party object 302.

In some non-limiting embodiments of the present technology the maximum possible velocity 408 can be a highest one of (a) a velocity value the third-party object 302 can physically achieve moving from the given anchor point and a consecutive anchor point, in view of the given third-party kinematic data 404, and (b) a maximum speed limit value prescribed for the road map section 340. At least some of these non-limiting embodiments allow accounting for drivers who do not obey the traffic rules.

Also, in the non-limiting embodiments of the present technology, the kinematic model 402 may be further configured to determine, based on the data listed above, additional third-party kinematic data 412 associated with the given braking profile 410. In these embodiments, the additional third-party kinematic data 412 is indicative of possible adverse effects on one of a driver, passengers, and components of the third-party object 302 that may result from the third-party object 302 decelerating according to the given braking profile 410.

Thus, in the non-limiting embodiments of the present technology, the additional third-party kinematic data 412 comprises at least one of (1) a maximum deceleration value within the given braking profile 410, a; and (2) a maximum jerk value within the given braking profile 410, With continued reference to FIG. 4 and referring back to FIG. 3, for generating the braking profile at the first anchor point 305 (depicted at the first visual representation 300 of the road map section 340), by the kinematic model 402, the processor 110 is configured to provide thereto the following data: (i) the first third-party kinematic data 309 including the coordinate value $x_1$ corresponding to the first anchor point 305 and the associated instantaneous velocity value $v_1$, for example, 70 km/h; (ii) a value of the maximum acceptable velocity 406 associated with the left turn 350, before the entrance 360 thereto, for example, 40 km/h.

In some non-limiting embodiments of the present technology, the kinematic model 402 may be configured to calculate the given braking profile 410 based on a most abrupt deceleration of the third-party object 302. In other words, the kinematic model 402 may be configured to calculate the given braking profile 410 based on a maximum deceleration value possible for the third-party object 302 to slow down to the maximum acceptable velocity 406 at the predetermined future location before the maneuver. Accordingly, the given braking profile 410, in this case, may be referred to as a most abrupt braking profile.

Thus, continuing with the example with respect to the first visual representation 300, the kinematic model 402, based on the most abrupt deceleration, may be configured to calculate the first braking profile 306 and respective values of the additional third-party kinematic data 412 associated therewith. Accordingly, the first braking profile 306 is a most abrupt braking profile given the first third-party kinematic data 309. As it can be appreciated from the first visual representation 300, a distance of the first braking profile 306 ends before the entrance 360 to the left turn 350. Therefore, the processor 110 may then be configured to determine that the first trajectory of the plurality of predicted trajectories associated with the third-party object 302 would be probable as the third-party object 302, based on the first braking profile 306, would be able to slow down from 70 km/h to 40 km/h before the entrance 360 to the left turn 350. The processor 110 would thus keep the first trajectory associated with the third-party object 302 for further generating the trajectory for the vehicle 220.

However, in another example, even though the processor 110 may have been determined, based solely on the distance of the first braking profile 306, that the first trajectory associated with the third-party object 302 would be probable, the processor 110 may reject it based on the associated values of the additional third-party kinematic data 412. For example, the processor 110 may determine that an associated maximum deceleration value, a within the first braking profile 306 is higher than a predetermined acceleration threshold value (for example, ±3 m/sec$^2$). Alternatively, the processor 110 may determine that an associated maximum jerk value, j within the first braking profile 306 is higher than a predetermined jerk threshold value. Thus, the processor may be configured to eliminate the first trajectory from the plurality of the predicted trajectories associated with the third-party object 302 for further generating the trajectory for the vehicle 220.

In other non-limiting embodiments of the present technology, the kinematic model 402 may be configured to generate the given braking profile 410 such that associated values of the additional third-party kinematic data 412 would not be higher than respective predetermined values. For example, the kinematic model 402 may be configured to calculate the given braking profile 410 with a minimum deceleration value necessary for the third-party object 302 to slow down to the maximum acceptable velocity 406. In another example, the kinematic model 402 may be configured to calculate the given braking profile 410 with an average deceleration value, i.e. a value within a range defined by the minimum deceleration value and the maximum deceleration value, at which the third-party object 302 could further slow down to the maximum acceptable velocity 406. Therefore, the given braking profile 410 may be referred to as a minimum abrupt braking profile and average abrupt braking profile, respectively.

Referring back to the first visual representation 300, the processor 110 may be configured, using the kinematic model 402, based on the first third-party kinematic data 309, to calculate an average abrupt braking profile 307 and a minimum abrupt braking profile 308. As can be appreciated for the first visual representation 300, according to either of the average abrupt braking profile 307 and the minimum abrupt braking profile 308, the third-party object 302 would not be able to slow down from 70 km/h to 40 km/h before the entrance 360 to the left turn 350. Therefore, the processor 110, based on either the average abrupt braking profile 307 or the minimum abrupt braking profile 308, can be configured to eliminate the first trajectory from the plurality of predicted trajectories associated with the third-party object 302 for further generating the trajectory for the vehicle 220.

As alluded to above, at each successive anchor point, the processor 110 is configured to calculate, by the kinematic model 402, a respective braking profile. Thus, at the second anchor point 315, the processor 110 is configured to calculate the second braking profile 316 based on the second third-party kinematic data 319, as depicted by the second visual representation 310. Accordingly, based on the second braking profile 316, the processor 110 would be configured to eliminate the first trajectory as improbable, from the plurality of predicted trajectories associated with the third-party object 302, for further generating the trajectory for the vehicle 220.

Finally, according to the non-limiting embodiments of the present technology, based on the elimination of the improbable trajectory from the plurality of the predicted trajectories associated with the third-party object 302, the processor 110 may be configured to generate the trajectory for the vehicle 220. For example, having determined that it is not probable that the third-party object 302 would take the left turn 350, and as such, the third-party object 302 would not slow down thereat, the processor 110 may cause the vehicle 220 to change a lane (for performing the left turn 350 at a future moment in time, for example), as can be appreciated by the third visual representation 320.

As can be further appreciated from the third visual representation 320, although the processor 110 has already eliminated the first trajectory from the plurality of predicted trajectories associated with the third-party object 302, the processor 110 may be configured to calculate, by the kinematic model 402, at the third anchor point 325, a third braking profile 326 based on the third third-party kinematic data 329. According to the non-limiting embodiments of the present technology, the processor 110 may be configured to calculate the third braking profile 326 for the third-party object 302, for example, with respect to another predicted trajectory including another maneuver that falls beyond the road map section 340.

It should be expressly understood that depending on a specific road map section, the plurality of predicted trajectories associated with the third-party object 302 may comprise more than one trajectory that includes a maneuver. Thus, in the non-limiting embodiments of the present technology, in order to generate the trajectory for the vehicle 220, the processor 110 may be configured to determine feasibility of each such trajectory including a maneuver, as it has been described above with reference to FIGS. 3 and 4.

Figure 5:
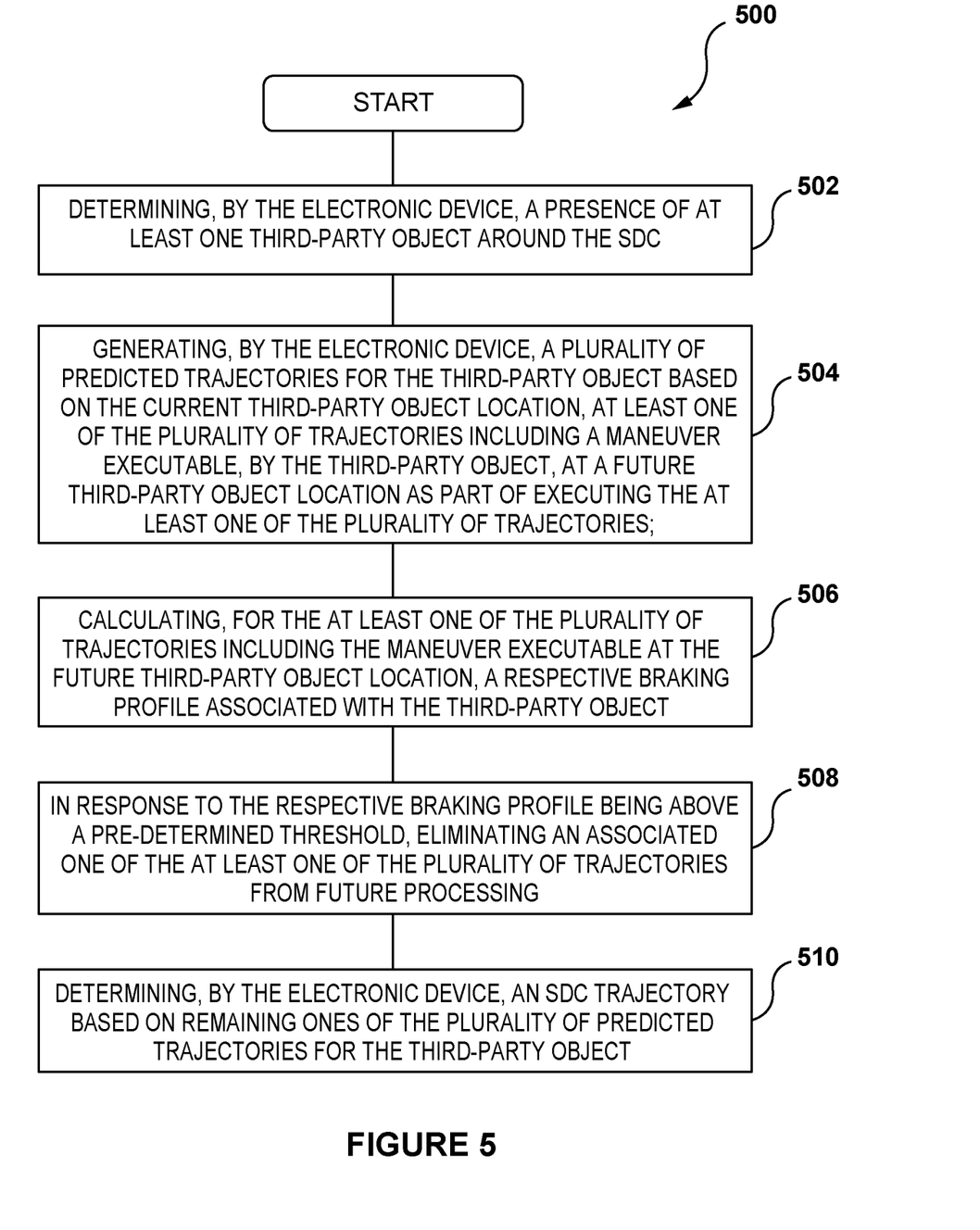
FIG. 5 depicts a flowchart diagram of a method for generating the trajectory for the vehicle present in the networked computing environment of FIG. 2, in accordance with the non-limiting embodiments of the present technology.

Given the architecture and the examples provided hereinabove, it is possible now to execute a method for generating a trajectory for an SDC (the vehicle 220, for example). With reference now to FIG. 5, there is depicted a flowchart of a method 500, according to the non-limiting embodiments of the present technology. The method 500 is executable by the processor 110. The processor 110 may, for example, be part of the electronic device 210.

Step 502—Determining, by the Electronic Device, a Presence of at Least One Third-Party Object Around the SDC At step 502, the processor 110 is configured, by one or more sensors associated with the vehicle 220 (such as the sensor system 230), to determine a presence of at least one third-party object (such as the third-party object 302 depicted in FIG. 3) travelling in a given road map section (such as the road map section 340), for example, in a neighbouring lane relative to which where the vehicle 220 is travelling.

In the non-limiting embodiments of the present technology, the third-party object 302 comprises a dynamic third-party object including another vehicle (such as a car, a truck, and the like), a cyclist, an astray animal, etc.

In the non-limiting embodiments of the present technology, the third-party object 302 is one of the plurality third-party objects (not depicted) present in the road map section 340. Thus, in some non-limiting embodiments of the present technology, the processor 110 may be configured to process every of the plurality of third-party objects (not depicted) present in the road map section 340. In other non-limiting embodiments of the present technology, the processor 110 may be configured to select, for the plurality of third-party objects (not depicted), the third-party object 302 only.

In the non-limiting embodiments of the present technology, the processor 110 is configured to select the third-party object 302 by applying a selection rule based on the third-party kinematic data captured by the sensor system 230.

In the non-limiting embodiments of the present technology, the third-party kinematic data comprises at least (1) a coordinate value along the coordinate axis 332, x; (2) an instantaneous velocity value, v; and (3) an instantaneous acceleration/deceleration value, a.

In some non-limiting embodiments of the present technology, the selection rule may be indicative of the driver associated with the third-party object 302 being a road-traffic offender.

Accordingly, in the non-limiting embodiments of the present technology, the processor 110, at the moment of determining the presence of the third-party object 302 and selection thereof, is configured to determine kinematic data associated with the third-party object 302 (such as the first third-party kinematic data 309 depicted at the first visual representation 300). Thus, for example, the processor 110 may be configured to determine that at the coordinate value $x_1$, corresponding to the first moment in time $t_1$, the third-party object 302 is moving, within the road map section 340, at the instantaneous velocity value $v_1$.

Step 504—Generating, by the Electronic Device, a Plurality of Predicted Trajectories for the Third-Party Object Based on the Current Third-Party Object Location, at Least One of the Plurality of Trajectories Including a Maneuver Executable, by the Third-Party Object, at a Future Third-Party Object Location as Part of Executing the at Least One of the Plurality of Trajectories At step 504, the processor 110 is configured to determine, based on the first third-party kinematic data 309 and the road map information, a plurality of predicted trajectories associated with the third-party object 302 where at least one trajectory includes a maneuver that the third-party object 302 may execute at a future location thereof. For example, as described above with reference to FIG. 3, the processor 110 may determine the plurality of predicted trajectories comprising (1) the first trajectory including executing the left turn 350 at the entrance 360 thereto; and (2) the second trajectory including continuing forward, without executing the left turn 350.

Step 506—Calculating, for the at Least One of the Plurality of Trajectories Including the Maneuver Executable at the Future Third-Party Object Location, a Respective Braking Profile Associated with the Third-Party Object At step 506, the processor 110 is configured to calculate a given braking profile for a respective one including a maneuver of the plurality of predicted trajectories associated with the third-party object 302.

To that end, according to the non-limiting embodiments of the present technology, the processor 110 is first configured to generate the plurality of anchor points associated with the third-party object 302, as described above with reference to FIG. 3. Further, the processor 110 is configured to successively, at each of the plurality of anchor points, calculate a respective braking profile.

In the non-limiting embodiments of the present technology, the given braking profile, calculated at a given anchor point, for the respective trajectory including the maneuver, is indicative of a distance that the third-party object 302 would require to slow down to an acceptable velocity value for performing the maneuver.

For example, as described above with reference to FIG. 3, the processor 110 may be configured to calculate, at the first anchor point 305, that first braking profile 306 based on the first third-party kinematic data 309. Further, as the third-party object 302 moves within the road map section 340, the processor 110 may be configured to calculate the second braking profile 316 at the second anchor point 315; and the third braking profile 326 at the third anchor point 325.

Step 508: In Response to the Respective Braking Profile being Above a Pre-Determined Threshold, Eliminating an Associated One of the at Least One of the Plurality of Trajectories from Future Processing At step 508, the processor 110, based on the given braking profile and an associated predetermined threshold value, is configured to either eliminate the respective one including the maneuver of the plurality of predicted trajectories associated with the third-party object 302, or assume it and keep it for further generating the trajectory for the vehicle 220.

In the non-limiting embodiments of the present technology, exceeding the associated predetermined threshold value is indicative of the respective one including the maneuver of the plurality of predicted trajectories associated with the third-party object 302 being improbable.

In some non-limiting embodiments of the present technology, a predetermined threshold is associated with the future location of the third-party object 302, before which the third-party object 302 can physically execute the maneuver if it has been able to decelerate to the acceptable velocity value associated with the maneuver.

As such, for example, the processor 110 may be configured to determine that the first braking profile 306, based on the distance associated therewith, ends before the entrance 360 to the left turn 350, which is to mean that the third-party object 302 would be able to decelerate to the acceptable velocity value v associated with the left turn 350 to enter the left turn 350 before the entrance 360 thereto. Accordingly, at the first moment in time $t_1$, the processor 110, based on the distance associated with the first braking profile 306, would assume the first trajectory for the third-party object 302 and would keep it for further generating the trajectory for the vehicle 220.

By contrast, the processor 110 may be configured to determine that the second braking profile 316 does not end before the entrance 360 to the left turn 350, which is to mean that, at the second moment in time $t_2$, the third-party object 302 would not be able to decelerate to the acceptable velocity value v associated with the left turn 350 before the entrance 360 thereto. Accordingly, at the second moment in time $t_2$, the processor 110, based on the distance associated with the second braking profile 316, would eliminate the first trajectory from the plurality of predicted trajectories associated with the third-party object 302 for further generating the trajectory for the vehicle 220.

In other non-limiting embodiments of the present technology, to calculate the given profile (such as the given braking profile 410) and to determine the predetermined threshold therefor, the processor 110 may be configured to access a kinematic model, such as the kinematic model 402 depicted in FIG. 4.

In the non-limiting embodiments of the present technology, the kinematic model may be configured to calculate the given braking profile 410 based on the following data: (i) the given third-party kinematic data 404, the given third-party kinematic data 404 having been determined by the processor 110 at the given anchor point; (ii) the maximum acceptable velocity 406 at the predetermined future location before the maneuver; and (iii) a maximum possible velocity 408 of the third-party object 302.

In some non-limiting embodiments of the present technology, the kinematic model 402 may be further configured to determine, based on the data listed above, additional third-party kinematic data 412 associated with the given braking profile 410. The additional third-party kinematic data 412 comprises at least one of (1) a maximum deceleration value within the given braking profile 410, a; and (2) a maximum jerk value within the given braking profile 410, j.

In some non-limiting embodiments of the present technology, the processor 110 having access to the kinematic model 402 may be configured to generate the given braking profile 410 based on the most abrupt deceleration of the third-party object 302, possible for executing the maneuver at the future location. For example, by doing so, the processor 110 may be configured to generate the first braking profile 306 based on the most abrupt deceleration as discussed above in respect of the first braking profile 306 with reference to FIGS. 3 and 4.

In some non-limiting embodiments of the present technology, the processor 110 may be configured to eliminate the respective one including the maneuver of the plurality of predicted trajectories associated with the third-party object 302 as improbable based on the predetermined acceleration threshold value (for example, ±3 m/sec$^2$) as described above in respect of the first braking profile 306 with reference to FIGS. 3 and 4.

In other non-limiting embodiments of the present technology, the processor 110 may be configured to eliminate the respective one including the maneuver of the plurality of predicted trajectories associated with the third-party object 302 as improbable based on the predetermined jerk threshold value as described above in respect of the first braking profile 306 with reference to FIGS. 3 and 4.

In some non-limiting embodiments of the present technology, the processor 110 having access to the kinematic model 402 may be configured to generate a average abrupt profile and a minimum abrupt profile, such as the average abrupt profile 307 and the minimum abrupt profile 308.

Step 510—Determining, by the Electronic Device, an SDC Trajectory Based on Remaining Ones of the Plurality of Predicted Trajectories for the Third-Party At step 510, having eliminated the respective one including the maneuver of the plurality of predicted trajectories associated with the third-party object 302, the processor 100 is configured to generate the trajectory for the vehicle 220 based on remaining ones of the plurality of predicted trajectories associated with the third-party object 302.

In the non-limiting embodiments of the present technology, generating the trajectory for the vehicle 220, the processor 110 may be configured to cause the vehicle 220 to decelerate, or otherwise actively accelerate, perform a maneuver (a lane change, for example), and the like, in order to avoid, or mitigate the risk of, a collision with any third-party objects in a given road map section.

For example, as described above in respect of the second visual representation 310 and the third visual representation 320 of the road map section 340, the processor 110 has eliminated, at the second anchor point 315, the first trajectory including executing the left turn 350, from the plurality of predicted trajectories associated with the third-party object 302. By doing so, the processor 110 has determined that the third-party object 302 would be more likely to proceed forward (taking the second one of the plurality of the associated trajectories); and the processor 110 may hence be configured to cause the vehicle 220 to make the lane change (to perform the left turn 350 at a future moment in time, for example) ensuring lower risks of collision between the vehicle 220 and other third-party objects travelling in the road map section 340.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for generating a trajectory for a self-driving car (SDC), the SDC being associated with an electronic device, the method executable by the electronic device, the method comprising:
   determining, by the electronic device, a presence of at least one third-party object around the SDC;
   determining, by the electronic device, a current third-party object location;
   generating, by the electronic device, a plurality of predicted trajectories for the third-party object based on the current third-party object location, at least one of the plurality of trajectories including a maneuver executable, by the third-party object, at a future third-party object location as part of executing the at least one of the plurality of trajectories;
   calculating, for the at least one of the plurality of trajectories including the maneuver executable at the future third-party object location, a respective braking profile associated with the third-party object,
      the respective braking profile being indicative of a speed adjustment maneuver of the third-party object to enable the third-party object to execute the maneuver at the future third-party object location, and
      the respective braking profile including at least one of a maximum associated acceleration value and a maximum associated jerk value of the third-party object when executing the maneuver;
   in response to the at least one of the maximum associated acceleration value and the maximum associated jerk value of the respective braking profile being above a respective pre-determined threshold value, eliminating an associated one of the at least one of the plurality of trajectories from future processing;
   determining, by the electronic device, an SDC trajectory based on remaining ones of the plurality of predicted trajectories for the third-party object.

2. The method of claim 1, wherein the third-party object is one of a plurality of third-party objects located in around the SDC.

3. The method of claim 2, wherein the method is executed for each of the plurality of third-party objects.

4. The method of claim 2, wherein the method further comprises selecting the third-party object from the plurality of third-party objects and executing the method only for the third-party object.

5. The method of claim 4, wherein the selecting the third-party object from the plurality of third-party objects comprises applying a selection rule.

6. The method of claim 5, wherein the selection rule is indicative of a driver associated with the third-party object being likely to be a traffic rules offender.

7. The method of claim 1, wherein the pre-determined threshold is indicative of the maneuver executable at the future third-party object location being improbable.

8. The method of claim 7, wherein the maneuver executable at the future third-party object location being improbable is indicative of the maneuver being physically impossible given the braking profile.

9. The method of claim 1, wherein the pre-determined threshold is determined using a kinematic model.

10. The method of claim 9, wherein the kinematic model is based on a most abrupt braking profile.

11. The method of claim 9, wherein the kinematic model is based on at least one of: a minimum braking profile, an average braking profile, and a most abrupt braking profile.

12. The method of claim 1, wherein the respective pre-determined threshold value for the maximum associated acceleration value is +/−3 m/sec$^2$.

13. The method of claim 1, wherein the third-party object is a dynamic third-party object.

14. The method of claim 1, wherein the plurality of predicted trajectories for the third-party object based on the current third-party object location is a plurality of maneuvers, by the third-party object, wherein
a given one of the plurality of maneuvers is executable at a respective one of future third-party object locations, and wherein the method is executable for each of the future third-party object locations.

15. An electronic device comprising:
a processor;
a communication interface for communicating with a sensor mounted on a Self-Driving Car (SDC);
the processor being configured to:
determine, by the electronic device, a presence of at least one third-party object around the SDC;
determine a current third-party object location;
generate a plurality of predicted trajectories for the third-party object based on the current third-party object location, at least one of the plurality of trajectories including a maneuver executable, by the third-party object, at a future third-party object location as part of executing the at least one of the plurality of trajectories;
calculate, for the at least one of the plurality of trajectories including the maneuver executable at the future third-party object location, a respective braking profile associated with the third-party object,
the respective braking profile being indicative of a speed adjustment maneuver of the third-party object to enable the third-party object to execute the maneuver at the future third-party object location, and
the respective braking profile including at least one of a maximum associated acceleration value and a maximum associated jerk value of the third-party object when executing the maneuver;
in response to the at least one of the maximum associated acceleration value and the maximum associated jerk value of the respective braking profile being above a respective pre-determined threshold value, eliminate an associated one of the at least one of the plurality of trajectories from future processing;
determine an SDC trajectory based on remaining ones of the plurality of predicted trajectories for the third-party object.

16. The electronic device of claim 15, wherein the processor is further configured to select the third-party object from a plurality of third-party objects based on a selection rule.

17. The electronic device of claim 15, wherein the processor, to determine the pre-determined threshold, is further configured to have access to a kinematic model.

* * * * *